United States Patent Office 3,448,100
Patented June 3, 1969

3,448,100
MANUFACTURE OF CARBOXYMETHYL HYDROALKYL MIXED CELLULOSE ETHERS
Clayton D. Callihan, Baton Rouge, Joseph R. Boudreaux, Plaquemine, and Cecil L. Smith, Baton Rouge, La., assignors to The Dow Chemical Company, Midland, Mich., a corporation of Delaware
No Drawing. Continuation-in-part of application Ser. No. 452,846, May 3, 1965. This application Apr. 18, 1968, Ser. No. 722,160
Int. Cl. C08b *11/02, 11/08*
U.S. Cl. 260—231                            9 Claims

ABSTRACT OF THE DISCLOSURE

A mixed carboxymethyl hydroxyalkyl cellulose ether is obtained in a substantially pure form according to a reaction sequence involving preparing a carboxymethyl derivative of cellulose, acidifying the derivative, and washing the acidified ether with water to remove reaction by-products. The washed ether is then dried to a residual moisture content sufficiently low that upon reaction with an alkylene oxide, the product retains a particulate, form, e.g., a fibrous physical state. Sufficient alkylene oxide is reacted with the ether in the presence of a catalytic amount of alkali to introduce the desired hydroxyalkyl substitution. The ether prepared according to the invention will have a carboxymethyl D.S. within the range from about 0.2 up to about 1, and a hydroxyalkyl M.S. within the range from about 0.2 to about 5. The improved process avoids the need for organic solvents to remove by-product salt in purification steps.

---

This application is a continuation-in-part of our application Ser. No. 452,846 filed May 3, 1965, now abandoned.

The present invention relates to the manufacture of carboxymethyl hydroxyalkyl cellulose ethers having a particulate, fibrous physical form resembling the starting cellulose fibers. The invention also comprehends a method for preparing such cellulose ethers in an essentially pure form, i.e., free of salt.

Techniques are constantly being sought for the preparation of essentially pure, water soluble cellulose ethers. Especially desirable are cellulose ethers which are not only free of etherifying reactants and reaction by-products but also substantially free of unreacted cellulose fibers.

In the past some of the objectives have been promoted by carrying out cellulose etherification reactions in the present of a solvent medium which facilitates uniform distribution of reactants and the maintaining of uniform reaction conditions. Teaching of this nature is set forth by Klug et al. in U.S. Patent 2,572,039. This technique, however, necessitates expensive solvent recovery and purification trains. Cellulose ethers have also been prepared by the direct reaction of etherifying organo halides or alkylene oxides and cellulose in the presence of alkali. For example, such reactions are taught by Waldeck, U.S. Patent 2,510,355 and Erickson, U.S. Patent 2,469,764. The products prepared by such methods, however, have required final washing or solution treatments to prepare an essentially purified product. When the desired ether product is water soluble, organic solvent extraction can be used, or if the ether is thermally gellable, hot water may be used. In any event, final purification with a liquid medium necessitates separation of the medium from the ether and often recovery thereof for reuse. Consequently, purification of the ether contributes a significant portion of the overall manufacturing cost.

The present invention involves both a novel product concept and a method of manufacture to provide the same. A more particular purpose, or object, of the invention is to provide a mixed carboxymethyl hydroxyalkyl cellulose ether characterized by water solubility and substantial freedom from insoluble fibers. A further object is to provide an efficient process for the manufacture of cellulose ethers which avoids the need for organic solvents in either the reaction system or the purification train for the reaction product. Particularly, it is an object of the invention to provide a process for purified water soluble cellulose ether wherein water is employed as a wash medium and the ether product is recovered in a particulate state resembling the starting cellulose fibers. The above objects, and other benefits as will become apparent hereinafter as the invention is more fully described, are achieved in the present invention.

The cellulose ether product of the present invention is a mixed carboxymethyl hydroxyalkyl cellulose ether wherein the hydroxyalkyl contains from 2 to 4 carbons, said ether being characterized by carboxymethyl degree of substitution (D.S.) of from about 0.2 to about 1 and a hydroxyalkyl molar substitution (M.S.) from about 0.2 to about 5. The total substitution is sufficient to provide a water soluble ether. In a preferred embodiment of the invention, the ether has a carboxymethyl D.S. within the range from about 0.3 to about 0.7 and a hydroxyalkyl M.S. within the range from about 0.5 to about 3. Preferred hydroxyalkyl groups are hydroxyethyl and hydroxypropyl. Other hydroxyalkyl groups are hydroxybutyl and 1,2-dihydroxypropyl.

The above cellulose ether product is prepared in accordance with the invention in a substantially pure form, i.e., free of salts, unreacted alkali and unreacted cellulose fibers. The invention comprises the following operations carried out in the sequence set forth.

A finely divided, particulate cellulose, alkali metal chloracetate and an alkali metal hydroxide are reacted in the presence of water sufficient to wet, but not dissolve, the reaction mass to provide a carboxymethyl cellulose having from about 0.2 D.S. up to about 1.0 D.S. of carboxymethyl groups. Preferably, the carboxymethyl D.S. is from about 0.3 up to about 0.7. An adequate amount of water to promote the desired reaction can be added to the system as water of solution along with the alkali metal hydroxide. It is immaterial as to the order of adding chloroacetate or the base to the cellulose. The chloroacetate may be added as such, or formed in situ by adding chloroacetic acid. While it is not necessary, it is usually desirable to carry out the reaction in the substantial absence of oxygen over a temperature range from about 25 C. up to about 90° C. The absence of oxygen ensures a high molecular weight, i.e. high viscosity product. Mixing of the reactants should be vigorous and, preferably, involves combining tumbling and beating motions. Illustratively, any of the reaction techniques taught by Waldeck in U.S. Patent 2,510,355 can be used.

The carboxymethyl cellulose prepared in the foregoing reaction is contacted with a fluid acid, preferably an acidific gas such as hydrogen chloride. Enough of the acid is employed to acidify, i.e., to reduce below pH 7, the alkali metal carboxymethyl cellulose produced in the foregoing step. If aqueous solutions of mineral acids are used, the acid should be added slowly and with care to avoid agglomerating the product. For best results, the aqueous acid is applied as a fine spray. By "acidific gas" is meant any gas which, when dissolved in water, forms an acid of sufficient strength to protonate the carboxyl groups of the cellulose ether.

The acidified carboxymethyl cellulose ether is then washed with water to remove alkali metal salts formed during the etherifying and acidfying reactions. As a result of the acidification step, the ether can be readily washed with water without product solvation. Throughout the acidification and washing steps, as specified above, the carboxymethyl cellulose ether retains a particulate from resembling the starting cellulose. In such physical form, the ether is substantially dewatered by simple filtration.

The acidic carboxymethyl cellulose thus obtained is dried to a residual moisture content such that upon reaction with the alkylene oxide in the following step, the product retains a particulate state. A satisfactory moisture content is within the range from about 20 percent to about 75 percent, based on the weight of the carboxymethyl cellulose ether composition. The lower limit is essential to ensure an effective rate of reaction. The upper limit is necessary to the formation of a readily dehydratable, particulate ether product. Preferably, the moisture content of the carboxymethyl ether is adjusted to within the range from about 45 percent up to 65 percent, based on the weight of the carboxymethyl cellulose ether composition.

As a rule, drying adequate to achieve such moisture levels cannot be effected solely by centrifugation or vacuum dewatering and thus additional drying by heating the wet ether product at moderate temperatures, which can take place either in the presence or absence of oxygen, is required to adjust the moisture content to within the desired range.

The dried, acidic carboxymethyl cellulose is then reacted with an alkylene oxide, such as ethylene oxide, propylene oxide, butylene oxide, or glycidol, in the presence of a catalytic amount of aqueous alkali metal hydroxide, such as sodium hydroxide. This reaction is carried out at a temperature within the range from about 25° C. up to about 85° C. Autogenous pressure is most convenient, but higher pressures can be utilized if desired. Enough of the alkylene oxide is reacted to impart to the cellulose ether a hydroxyalkyl substitution within the range from about 0.2 M.S. to about 5 M.S. Preferably, the hydroxyalkyl substitution is from about 0.5 M.S. up to about 3 M.S.

Other suitable catalysts include, for example, basic organics such as tetra alkyl, ammonium hydroxide, and trialkyl amines.

The catalytic amount of basic catalyst for the addition of an alkylene oxide to cellulose, preferably a basic catalyst such as an alkali metal hydroxide. The amount of catalyst should be at least 0.01 percent by weight, based on the weight of the carboxymethyl cellulose ether, and may vary considerably above this minimum. Best results are achieved, however, if the catalyst does not exceed about 1 percent by weight of the cellulose ether. This minimizes impurities in the final product.

By catalytic amount of alkali metal hydroxide is meant the excess of alkali metal hydroxide over that required to effectively neutralize the carboxylic ether groups already attached to the cellulose. Catalytic amounts of solid alkali metal hydroxide can be mixed with the acidified carboxymethyl cellulose but preferably, for the purpose of improved efficiency in the neutralization reaction and uniform distribution of the catalyst, the alkali metal hydroxide is applied to the ether by spraying in the form of an aqueous solution. Care should be taken to ensure that any water added with the alkali metal hydroxide does not increase the moisture content above that specified above for the final hydroxyalkylation reaction.

Following the reaction with alkylene oxide, the alkali metal carboxymethyl hydroxyalkyl mixed cellulose ether is obtained in a particuate form corresponding to the physical state of the particulate cellulose starting material. This material is readily dried as by heating at moderately elevated temperatures to provide an essentially pure, particulate ether of the described composition.

The products thus prepared are essentially pure, except for glycol which may have been introduced in the oxyalkylation step. They are further characterized as non-gelling, water-soluble cellulose ethers, which are substantially free of insoluble fibers. The products are especially useful as thickeners and suspension stabilizers.

To illustrate the invention and the importance of process parameters described hereinbefore, several mixed carboxymethyl hydroxyalkyl cellulose ethers were prepared in the following examples.

Example 1

Cellulose in the form of cotton linters was ground to a particle size small enough to pass through a screen with 0.0092 inch square openings. Fifty pounds of the ground cellulose was then placed in a stirred reactor and sprayed with 27.2 pounds of caustic as a 50 percent solution. Subsequently, an aqueous solution of monochloroacetic acid was sprayed onto the alkali cellulose as it was vigorously agitated at 35° C. for a period of about 3 hours. The total monochloroacetic acid added was 32.2 pounds. After 4.5 hours from beginning the addition of the monochloroacetic acid, sufficient hydrochloric acid was slowly sprayed on the reaction mass to neutralize the sodium carboxymethyl cellulose and to acidify the reaction mass to about pH 1.0.

The carboxymethyl cellulose thus prepared contained about 0.66 carboxymethyl group per anhydroglucose residue moiety, i.e., it had a carboxymethyl D.S. of 0.66. The carboxymethyl cellulose ether was then washed with water at room temperature to remove all traces of salt impurities. At that degree of substitution, the acidified cellulose ether was insoluble in water. Moreover, the ether retained the original particulate physical form of the cellulose starting material.

After washing, the carboxymethyl cellulose ether was subjected to centrifugation to remove as much free water as possible. When dried in this manner, the product contained approximately 81 percent moisture or in equivalent terms about 4 pounds of water per pound of cellulose ether. This ether product was divided into aliquots for further reaction under different conditions in accordance with the invention.

In one run, a quantity of the above purified carboxymethyl cellulose was dried in the acid form to a residual moisture content of 61 weight percent by vacuum drying in an oven at 60° C. Four hundred sixty grams of this carboxymethyl cellulose (solid basis) was charged to an air-tight, agitated reactor, along with 83 grams of sodium hydroxide sprayed into the reactor as a 50 percent aqueous solution. After neutralization of the acidic carboxylic groups, there remained an excess of caustic to the extent of about 1 percent by weight of the ether.

The reactor temperature was adjusted to 40° C. and ethylene oxide was introduced under 20 p.s.i.a. The ethylene oxide reacted at the rate of about 2.5 grams per minute. This was continued until 468 grams of the oxide had been introduced.

At the completion of the ethylene oxide addition and after venting the reactor to the atmosphere, a solid, fibrous alkali metal carboxymethyl hydroxyethyl cellulose ether was recovered as essentially pure product. Residual alcohols and ethers formed as by-products from the ethylene oxide were largely removed from the ether upon venting of the reaction system. Additional water and other volatiles were removed by subjecting the ether to a temperature of about 60° C. for 24 hours. The ether thus prepared was a free-flowing, fibrous appearing solid having a carboxymethyl D.S. of 0.66 and a hydroxyethyl M.S. of .94. If readily dissolved in water to form a clear non-thermogelling solution.

Example 2

An additional run was made utilizing the above prepared carboxymethyl cellulose ether which had been dried to a residual moisture content of 59 percent by weight of the ether. Enough caustic was added to neutralize the carboxylic groups with a sufficient additional amount to provide catalytic caustic equal to about 0.05 percent by weight of the reaction mass. The temperature on the reaction system was then adjusted to 40° C. and ethylene oxide metered into the reaction system under a pressure of 20 p.s.i.a. Under these conditions, ethylene oxide reacted at the rate of 2.03 grams per minute. After about 3 hours, an essentially pure mixed cellulose ether was recovered having a carboxymethyl D.S. of 0.6 and a hydroxyethyl M.S. of 0.66. The efficiency of the ethylene oxide addition was 26.7 percent.

Example 3

In still another run, the effect of the total water content of the carboxymethyl cellulose ether mass employed for the final hydroxyalkylation reaction is demonstrated.

This run was carried out in the manner similar to that of Example 1 except that the excess caustic in the second reaction stage was 0.4 percent by weight of the ether. Also the total moisture content was initially 38.5 percent by weight of the ether. Propylene oxide was added to the reaction system at 60°–80° C. and the reaction proceeded at the rate of 1.2 grams per minute. After about 3 hours, sufficient water was added to increase the water level to 48.4 weight percent. This increased the oxide addition rate to 1.7 grams per minute. The lower moisture limit for this reaction is about 20 weight percent water based on the starting carboxymethyl ether reactant.

What is claimed is:

1. A process for the manufacture of a carboxymethyl hydroxyalkyl mixed cellulose ether wherein the hydroxyalkyl contains from 2 to 4 carbons, which comprises forming a carboxymethyl cellulose ether having a carboxymethyl D.S. within the range from about 0.2 to about 1.0 by reacting cellulose, alkali metal hydroxide and chloroacetate, acidifying the carboxymethyl cellulose prepared in the foregoing step by contacting it with a fluid proton donor acid, washing the acidified carboxymethyl cellulose ether with water to remove impurities, drying the carboxymethyl cellulose ether to a moisture content within the range of 20 to 75 percent by weight of the ether, reacting the carboxymethyl cellulose ether with an alkylene oxide having from 2 to 4 carbons in the presence of a catalytic amount of a basic catalyst for the addition of an alkylene oxide to cellulose, said catalyst being employed in an amount at least 0.01 percent by weight, on the weight of the cellulose ether, to provide an ether with a hydroxyalkyl M.S. within the range from about 0.2 to about 5, whereby an essentially salt-free, water-soluble carboxymethyl hydroxyalkyl cellulose ether is obtained in a particulate form.

2. A process as in claim 1 wherein the catalyst is an alkali metal hydroxide in an amount within the range from about 0.05 up to about 1 percent, based on the weight of the ether.

3. A process as in claim 1 wherein the alkylene oxide is ethylene oxide.

4. A process as in claim 1 wherein the alkylene oxide is propylene oxide.

5. A process for the manufacture of a carboxymethyl hydroxyalkyl mixed cellulose ether wherein the hydroxyalkyl contains from 2 to 4 carbons which comprises reacting a finely divided, particulate cellulose, alkali metal chloroacetate and an alkali metal hydroxide in the substantial absence of oxygen and in the presence of water sufficient to wet, but not dissolve the reaction mass, to provide a carboxymethyl cellulose ether having a carboxymethyl D.S. within the range from about 0.2 to about 1.0 and acidifying the carboxymethyl cellulose prepared in the foregoing step by contacting it with a fluid proton donor acid, washing the acidified carboxymethyl cellulose ether with water to remove impurities, drying the carboxymethyl cellulose ether to a moisture content within the range of 20 to 75 percent by weight of the ether, reacting the carboxymethyl cellulose ether with an alkylene oxide having from 2 to 4 carbons in the presence of a catalytic amount of an alkali metal hydroxide in an amount at least 0.01 percent by weight, based on the weight of the cellulose ether, to provide an ether with an hydroxyalkyl M.S. within the range from about 0.2 to about 5, whereby an essentially pure, water-soluble carboxymethyl hydroxyalkyl cellulose ether is obtained in a particulate fibrous form.

6. A process as in claim 5 wherein the fluid acid is gaseous hydrogen chloride.

7. A process as in claim 5 wherein the catalytic amount of alkali hydroxide is within the range from about 0.05 up to about 1 percent, based on the weight of the ether.

8. A process as in claim 5 wherein the carboxymethyl cellulose ether is dried to a residual moisture content in the range from about 45 up to about 65 percent, based on the weight of the ether.

9. A process as in claim 5 wherein the alkali metal hydroxide is sodium hydroxide and the alkylene oxide is ethylene oxide.

References Cited

UNITED STATES PATENTS

| | | | |
|---|---|---|---|
| 3,284,353 | 10/1956 | Batdorf et al. | 252—8.5 |
| 2,635,972 | 4/1953 | Azorlosa et al. | 260—231 |
| 2,618,595 | 10/1952 | Gloor | 252—8.5 |

DONALD E. CZAJA, *Primary Examiner.*

R. W. MULCAHY, *Assistant Examiner.*